US012719559B2

(12) United States Patent
Rana et al.

(10) Patent No.: US 12,719,559 B2
(45) Date of Patent: Aug. 25, 2026

(54) METHODS, APPARATUS, AND SYSTEMS FOR SWITCHING BETWEEN INMARSAT AND IRIDIUM LINK WITH COMMON ANTENNA

(71) Applicant: Honeywell International Inc., Charlotte, NC (US)

(72) Inventors: Narayan Singh Rana, Charlotte, NC (US); Rajesh Chivukula, Charlotte, NC (US); Nasana Narendra, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 445 days.

(21) Appl. No.: 18/364,129

(22) Filed: Aug. 2, 2023

(65) Prior Publication Data

US 2024/0421892 A1 Dec. 19, 2024

(30) Foreign Application Priority Data

Jun. 16, 2023 (IN) ............................ 202311041095

(51) Int. Cl.
*H04B 7/185* (2006.01)
*H04W 36/00* (2009.01)

(52) U.S. Cl.
CPC ..... *H04B 7/18508* (2013.01); *H04B 7/18513* (2013.01); *H04W 36/00222* (2023.05)

(58) Field of Classification Search
CPC ........... H04B 7/18508; H04B 7/18513; H04W 36/00222
See application file for complete search history.

(56) References Cited

U.S. PATENT DOCUMENTS

| | | | |
|---|---|---|---|
| 7,605,757 | B1 | 10/2009 | Gribble et al. |
| 8,019,338 | B2 | 9/2011 | Malaga et al. |
| 8,774,795 | B2 | 7/2014 | Zaruba et al. |
| 9,191,783 | B2 | 11/2015 | Soliman |
| 11,251,862 | B2 | 2/2022 | Zhou et al. |

(Continued)

FOREIGN PATENT DOCUMENTS

| | | | |
|---|---|---|---|
| CN | 107707295 | A | 2/2018 |
| CN | 112994781 | A | 6/2021 |
| EP | 2874321 | B1 | 3/2016 |

OTHER PUBLICATIONS

Kerczewski, Robert J., Mike Meza, and Om Gupta. “Application of the iridium satellite system to aeronautical communications.” 14th Ka and Broadband Communications Conference. No. E-16727. 2008. (Year: 2008).*

(Continued)

*Primary Examiner* — Sharad Rampuria
(74) *Attorney, Agent, or Firm* — Alston & Bird LLP

(57) ABSTRACT

A method, apparatus, and computer program product are provided. In the contexts of a method, the method detects a radio signal using a single antenna configured to detect a plurality of radio signal types. The method determines a frequency of the radio signal. The method determines a radio signal type of the radio signal based at least on the frequency. The method determines a strength of the radio signal. The method transforms the radio signal based at least on the radio signal type or the strength of the radio signal.

18 Claims, 5 Drawing Sheets

(56) References Cited

U.S. PATENT DOCUMENTS

| | | | | |
|---|---|---|---|---|
| 2005/0143005 | A1* | 6/2005 | Moore | H04B 7/18521 455/454 |
| 2005/0242990 | A1 | 11/2005 | Lawrence et al. | |
| 2006/0292990 | A1 | 12/2006 | Karabinis et al. | |
| 2015/0131498 | A1* | 5/2015 | Rana | H04L 5/08 370/297 |
| 2015/0296500 | A1 | 10/2015 | Kanovsky et al. | |
| 2020/0244346 | A1* | 7/2020 | Goettle | H04B 7/18508 |
| 2020/0287619 | A1* | 9/2020 | Tavner | G05D 1/101 |
| 2022/0021443 | A1* | 1/2022 | Zhou | H04W 36/142 |
| 2022/0137236 | A1* | 5/2022 | Conflitti | G01S 19/36 342/357.25 |

OTHER PUBLICATIONS

Cox, Donald C. "A radio system proposal for widespread low-power tetherless communications." IEEE Transactions on Communications 39.2 (2002): 324-335. (Year: 2002).*

Extended European Search Report Mailed on Nov. 27, 2024 for EP Application No. 24177732, 9 page(s).

* cited by examiner

METHODS, APPARATUS, AND SYSTEMS FOR SWITCHING BETWEEN INMARSAT AND IRIDIUM LINK WITH COMMON ANTENNA

CROSS-REFERENCE TO RELATED APPLICATIONS

This application claims priority to India Provisional Patent Application No. 202311041095, filed Jun. 16, 2023, the contents of which are incorporated by reference herein in its entirety.

FIELD OF THE INVENTION

The present disclosure relates generally to methods, apparatuses, and systems associated with radio signal transmission and reception, and more particularly, to methods, apparatuses, and systems for switching between INMARSAT and Iridium link.

BACKGROUND

Global satellite communications may utilize or benefit from more than one radio signal type at different times. Two of the radio signal types that may be utilized are INMARSAT and Iridium radio signals. In different areas or circumstances, an Iridium signal may be more advantageous, and in others an INMARSAT signal may be more advantageous.

Many systems and methods do not overcome technical challenges and difficulties associated with handling both INMARSAT and Iridium signals. For example, many systems attempt to utilize two independent radios in a single vehicle. For example, a vehicle may contain a radio for INMARSAT transmission and a radio for Iridium transmission. Other systems use a single radio and entirely disable the service of the signal not being used. In these systems, satellite communication is interrupted when switching between signals.

BRIEF SUMMARY

In one or more embodiments, a method is provided. The method includes detecting a radio signal using a single antenna configured to detect a plurality of radio signal types. The method includes determining a frequency of the radio signal. The method includes determining a radio signal type of the radio signal based at least on the frequency. The method includes determining a strength of the radio signal. The method includes transforming the radio signal based at least on the radio signal type or the strength of the radio signal.

In one or more embodiments, the single antenna is further configured to cause transmission of a plurality of radio signal types.

In one or more embodiments, the method includes determining a selected radio signal type of the plurality of radio signal types. In one or more embodiments, the method includes causing transmission of the selected radio signal type using the single antenna.

In one or more embodiments, the radio signal type comprises one of Iridium or INMARSAT.

In one or more embodiments, in a circumstance where the radio signal type describes a common frequency range for uplink and downlink transmission, determining a signal pulse width of the radio signal.

In one or more embodiments, the method includes determining a transmission direction indicative of a downlink command or an uplink command of the radio signal based at least on the signal pulse width.

In one or more embodiments, the method includes the radio signal is transformed based further on the transmission direction.

In one or more embodiments, the method includes transforming the radio signal comprises toggling a switch position based at least in part on at least one of the radio signal type and the strength of the radio signal.

In one or more embodiments, the switch position controls a radio signal transformation.

In one or more embodiments, an apparatus is provided. The apparatus includes at least one processor and at least one non-transitory memory having computer-coded instructions stored thereon that, in execution with the at least one processor causes the apparatus to perform any one of the example methods described herein.

In one or more embodiments, a computer program product is provided. The computer program product includes at least one non-transitory computer-readable storage medium having computer program code and stored thereon that, in execution with at least one processor, configured the computer program product to perform any one of the example methods described herein.

Other technical features may be readily apparent to one skilled in the art from the following figures, descriptions, and claims.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
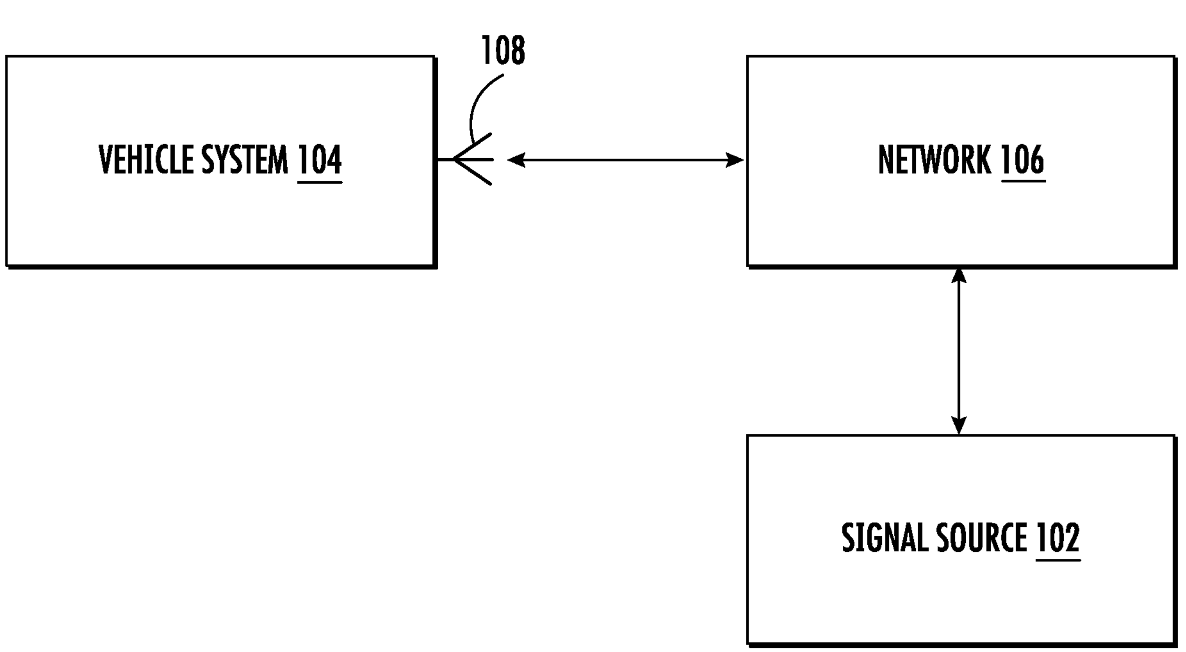
FIG. 1 illustrates an example schematic diagram of an example system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein;

rather, these embodiments are provided so that this disclosure will satisfy applicable legal requirements. Like numbers refer to like elements throughout.

Definitions

The phrases "in one embodiment," "according to one embodiment," "for example," "in some examples," "as an example," and the like generally mean that the particular feature, structure, or characteristic following the phrase may be included in at least one embodiment of the present disclosure, and may be included in more than one embodiment of the present disclosure (such phrases do not necessarily refer to the same embodiment).

The word "example" or "exemplary" is used herein to mean "serving as an example, instance, or illustration." Any implementation described herein as "example" or "exemplary" is not necessarily to be construed as preferred or advantageous over other implementations.

If the specification states a component or feature "may," "can," "could," "should," "would," "preferably," "possibly," "typically," "optionally," "for example," "in some examples," "often," or "might" (or other such language) be included or have a characteristic, that a specific component or feature is not required to be included or to have the characteristic. Such component or feature may be optionally included in some embodiments, or it may be excluded.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "electronically coupled," "electronically coupling," "electronically couple," "in communication with," "in electronic communication with," or "connected" in the present disclosure refers to two or more components (for example but not limited to, client device(s), a data analytics system, database(s)) being connected through wired means (for example but not limited to, wired Ethernet) and/or wireless means (for example but not limited to, Wi-Fi, Bluetooth, ZigBee), such that data and/or information may be transmitted to and/or received from these components.

The term "vehicle" may be used to describe any machine, robot, computing devices, and/or apparatus comprised of hardware, software, firmware, and/or any combination thereof, that maneuvers throughout an environment through any medium. In some contexts, a vehicle is utilized to transport objects, entities (e.g., people, animals, or other beings), or other onboard cargo. In some situations, a vehicle may be transporting no object except for the vehicle itself. Vehicles may be used for transportation on land, in water, in air, or across any other medium. Examples of vehicles include airplanes, helicopters, drones, cars, trucks, submarines, boats, and/or the like. Vehicles are not limited to the examples listed herein and may include any type of transportation device.

Overview

Many systems and methods suffer from technical challenges and difficulties associated with handling multiple radio signal types. For example, such systems and methods do not overcome technical challenges and difficulties associated with handling INMARSAT and Iridium signals. As another example, many systems require excess components, adding to a weight of an air vehicle transporting the components. As another example, many systems disable service of a radio signal type not being used. As another example, many systems use strong interference techniques to handle multiple radio signal types.

Various examples in accordance with the present disclosure may overcome these challenges and difficulties. In some example embodiments, a single radio is used for multiple radio signal types. Such embodiments provide a myriad of technical advantages. For example, such embodiments reduce the weight of equipment onboard a vehicle, reduce the need for extra cables, boxes, line replaceable units, processors, power supplies, and other control and interface circuits, and can reduce the overall size required to accommodate multiple units utilized in certain existing implementations. Additionally or alternatively, some embodiments described herein allow switching between multiple radio types without disabling service of the system not being used. Such examples provide technical advantages by allowing dynamic switching between signal types. Additionally or alternatively still, such embodiments allow switching between radio signal types without negative impacts often resulting from traditionally utilized strong interference techniques.

FIG. 1 illustrates an example system architecture 100 within which embodiments of the present disclosure may operate. The system architecture 100 includes at least a vehicle system 104, a network 106, and a signal source 102. The vehicle system 104 may transmit and receive uplink and downlink signals to and from the signal source 102 via the network 106.

The signal source 102 may be any device configured to receive and/or transmit satellite communications. Electronic data received by the vehicle system 104 from the signal source 102 be provided in various forms and via various methods. For example, the signal source 102 may include radio devices, desktop computers, laptop computers, smartphones, netbooks, tablet computers, wearables, and the like. In some examples, the signal source 102 may include another vehicle system. In one or more embodiments, signal source 102 comprises a ground station air traffic control. In one or more embodiments, a signal source 102 embodies at least one computing device, or a combination of interconnected computing devices, onboard a vehicle.

The vehicle system 104 may be embodied by a number of components including one or more computing devices. For example, the vehicle system 104 may comprise at least one processor and at least one non-transitory memory storing computer program instructions. These computer program instructions may direct the vehicle system to function in a particular manner, such that the instructions stored in the at least one non-transitory memory may produce an article of manufacture, the execution of which may implement embodiments of the present disclosure. In one or more embodiments, a vehicle system is embodied onboard a vehicle. In some embodiments, the vehicle embodies an air travel vehicle (e.g., a plane, an unmanned aerial vehicle, and/or the like), a ground travel vehicle (e.g., a car or other automobile, an autonomous ground vehicle, and/or the like), and/or a water travel vehicle (e.g., a boat, a seaplane, a submersible vehicle, and/or the like). In one or more embodiments, vehicle system 104 is configured to support a single antenna 108 configured to transmit and receive a plurality of radio signal types (e.g., INMARSAT and Iridium radio signals). In one or more embodiments, the vehicle system 104 includes components configured to transform a plurality of signal types (e.g., INMARSAT and Iridium radio signals).

In one or more embodiments, the vehicle system 104 comprises single antenna 108. In one or more embodiments, single antenna 108 is configured to receive and transmit uplink and downlink signals from signal source 102 via network 106. In one or more embodiments, single antenna 108 is configured to receive a plurality of radio signal types. In one or more embodiments, single antenna 108 is configured to receive both Iridium and INMARSAT radio signals. In one or more embodiments, single antenna 108 is configured to transmit a plurality of radio signal types. In one or more embodiments, single antenna 108 is configured to transmit both Iridium and INMARSAT radio signals.

The signal source 102 may be any device configured to receive and/or transmit satellite communications. Electronic data received by the vehicle system 104 from the signal source 102 be provided in various forms and via various methods. For example, the signal source 102 may include radio devices, desktop computers, laptop computers, smartphones, netbooks, tablet computers, wearables, and the like. In some examples, the signal source 102 may include another vehicle system. In some examples, one signal source 102 may be assigned to a signal source identifier that uniquely identifies the signal source. In some examples, the signal source identifier may comprise an American Standard Code for Information Interchange (ASCII) text, a pointer, a memory address, and the like. In one or more embodiments, signal source 102 comprises a ground station air traffic control. In one or more embodiments, a signal source 102 embodies at least one computing device, or a combination of interconnected computing devices, onboard a vehicle, for example any of the vehicles described herein.

The network 106 may be embodied in any of a myriad of network configurations. In one or more embodiments, the network 106 embodies a satellite network. In one or more embodiments, the network 106 is configured to relay satellite communications. In one or more embodiments, network 106 is configured to relay INMARSAT signals. In one or more embodiments, network 106 is configured to relay Iridium signals. In one or more embodiments, network 106 comprises one or more constellations. The network 102 in some embodiments includes one or more satellite(s), base station(s), relay(s), router(s), switch(es), cell tower(s), communications cable(s) and/or associated routing station(s), and/or the like.

Data that is transmitted via the uplink and downlink beams between the signal source 102 and the vehicle system 104 can be any of a wide variety of data including, but not limited to digital imagery data including video data, audio data as well as data provided by sensors, radars, telescopes and radio receivers. In at least some instances, the data is encoded prior to communication of the data via the uplink and downlink beams and decoded upon reception. The resulting data received may be utilized for a variety of purposes including presentation to a user, storage of the data for subsequent use and/or provision of the data to one or more applications, such as applications that perform statistical inference on the data for various purposes including object recognition, image classification, spectrum sensing, speech transcription and/or prediction or detection of events. In some examples, data is transmitted through Iridium signals. In some examples, data is transmitted through INMARSAT signals.

Figure 2:
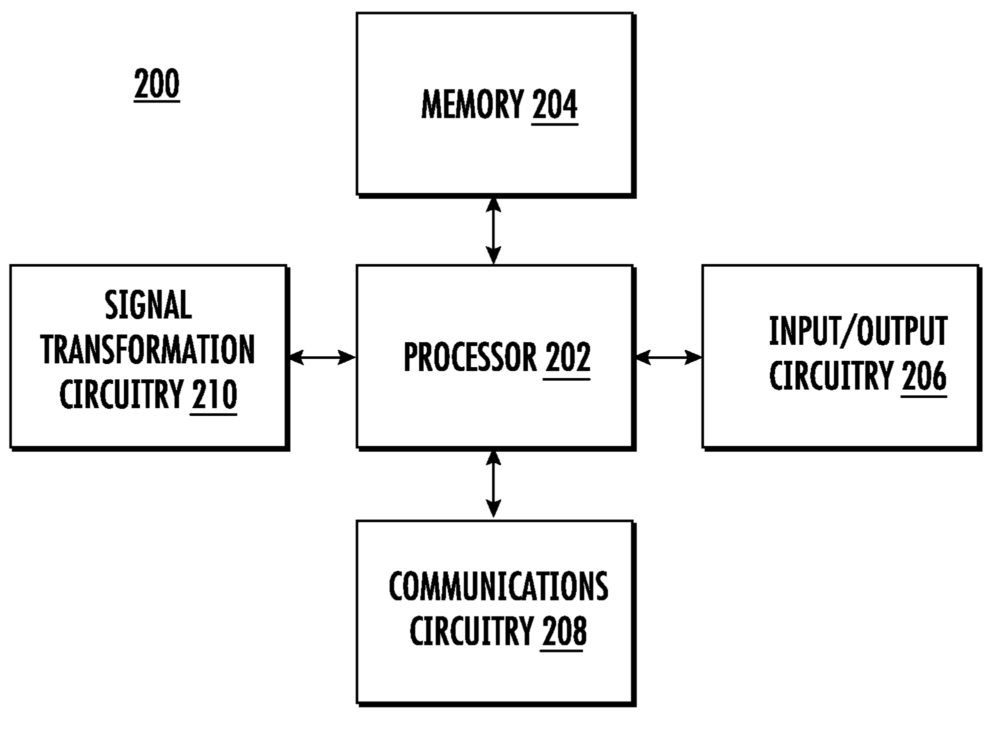
FIG. 2 illustrates an example block diagram of an example apparatus in accordance with various embodiments of the present disclosure.

The vehicle system 104 of FIG. 1 may be embodied by one or more computing systems, such as apparatus 200 as shown in FIG. 2. The apparatus 200 may include a processor 202, a memory 204, an input/output circuitry 206, a communications circuitry 208 and/or a signal transformation circuitry 210. The apparatus 200 may be configured to execute the operations described above with respect to FIG. 1 and below with respect to FIGS. 3-5.

Although these components are described with respect to functional limitations, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

In some example embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys, a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) and/or other hardware or software to cause transmission of signals via the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some example embodiments, the apparatus 200 includes signal transformation circuitry 210. In one or more embodiments, signal transformation circuitry 210 includes hardware, software, firmware, and/or a combination thereof that supports receiving radio signals, such as satellite communications. In one or more embodiments, signal transformation circuitry 210 includes hardware, software, firmware, and/or a combination thereof that supports receiving radio signals that are of a plurality of different radio signal types. In one or more embodiments, signal transformation circuitry 210 includes hardware, software, firmware, and/or a combination thereof that supports determining a radio signal type of the received satellite communications. In one or more embodiments, signal transformation circuitry 210 includes hardware, software, firmware, and/or a combination thereof that supports transforming a received radio signal. In one or more embodiments, signal transformation circuitry 210 includes hardware, software, firmware, and/or a combination thereof that supports transmitting a plurality of types of radio signals, such as satellite communications. In one or more embodiments, signal transformation circuitry 210 includes hardware, software, firmware, and/or a combination thereof that supports receiving and transmitting Iridium and INMARSAT signals. In one or more embodiments, signal transformation circuitry 210 comprises single antenna 108. In one or more embodiments, single antenna 108 is configured to receive and transmit uplink and downlink signals from signal source 102 via network 106. In one or more embodiments, single antenna 108 is configured to receive a plurality of radio signal types. In one or more embodiments, single antenna 108 is configured to receive both Iridium and INMARSAT radio signals. In one or more embodiments, single antenna 108 is configured to transmit a plurality of radio signal types. In one or more embodiments, single antenna 108 is configured to transmit both Iridium and INMARSAT radio signals. In one or more embodiments, signal transformation circuitry 210 includes hardware, software, firmware, and/or a combination thereof that supports differentiating between uplink and downlink signals. In one or more embodiments, signal transformation circuitry 210 includes hardware, software, firmware, and/or a combination thereof that supports performing any of the functions of the apparatus 200 onboard a vehicle. In one or more embodiments, signal transformation circuitry 210 includes hardware, software, firmware, and/or a combination thereof that supports performing any of the functions of the apparatus 200 onboard an air vehicle.

Figure 3:
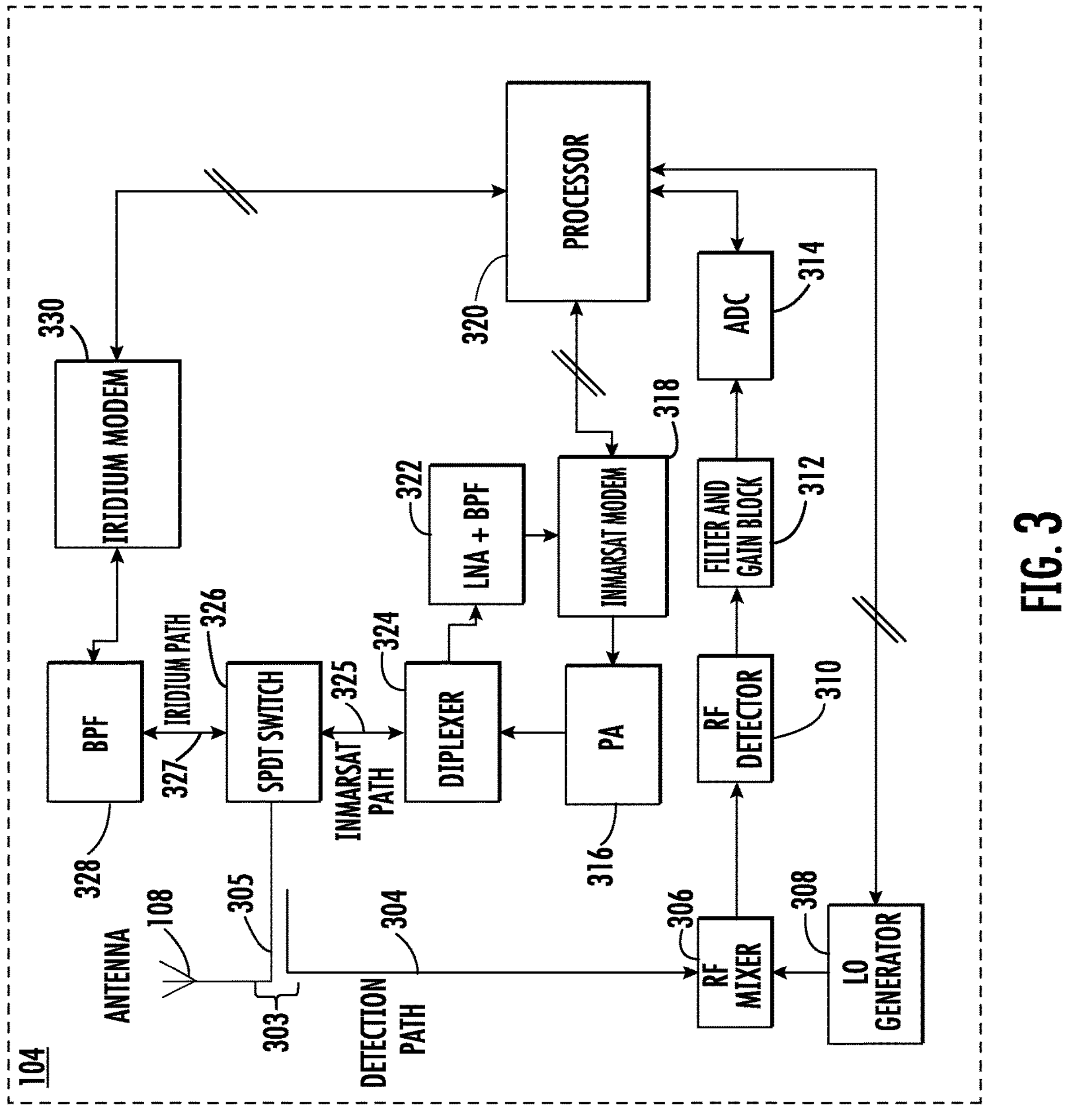
FIG. 3 illustrates an example block diagram of specially arranged computing elements of an example apparatus configured to provide multi-signal processing via a single antenna in accordance with various embodiments of the present disclosure.

Turning now to FIG. 3, an example vehicle system 104 is illustrated. Vehicle system 104 may use any of the illustrated components in order to receive and transmit satellite communications. However, in some example embodiments, not all of the illustrated components will be used to perform the functions described herein. In other example embodiments, additional components not illustrated may be used to receive and transmit satellite communications. One or more of the illustrated components may be embodied by, for example, apparatus 200.

In one or more embodiments, vehicle system 104 is configured to perform its operations onboard a vehicle. For example, vehicle system 104 may perform its operations onboard an air vehicle. In one or more embodiments, vehicle system 104 receives radio signals onboard an air vehicle and from an air traffic control station. In one or more embodiments, vehicle system 104 transmits a plurality of radio signal types from a vehicle.

Vehicle system 104 may comprise antenna 108. In one or more embodiments, antenna 108 is configured to receive and transmit a plurality of radio signal types. In one or more embodiments, antenna 108 is configured to receive and/or transmit Iridium signals. In one or more embodiments, antenna 108 is configured to receive and/or transmit INMARSAT signals. In one or more embodiments, antenna 108 is configured to receive and/or transmit a plurality of radio signal types. In one or more embodiments, antenna 108 is coupled to a transmitter and/or a receiver. In one or more embodiments, antenna 108 comprises a single antenna. In one or more embodiments, the antenna 108 is configured to transmit and/or receive signals with a frequency between 1616 MHz and 1626 MHz. In one or more embodiments, the antenna 108 is configured to receive signals with a frequency between 1525 MHz and 1559 MHz. In one or more embodiments, the antenna 108 is configured to transmit signals with a frequency between 1626.5 and 1660.5 MHz.

In one or more embodiments, when a signal is received at antenna 108, the signal follows detection path 304. In one or more embodiments, detection path 304 comprises a coupled path of a coupler 303. In one or more embodiments, the main path 305 of the coupler leads to switch 326. In one or more embodiments, coupled detection path 304 leads to radio frequency mixer 306.

In one or more embodiments, radio frequency mixer 306 is configured to mix a radio signal received from detection path 304 with a radio signal received from local oscillator generator 308. In one or more embodiments, radio frequency mixer 306 is configured to create a new frequency based on the frequency of signals received from detection path 204 and local oscillator generator 308. In one or more embodiments, radio frequency mixer 306 further comprises a surface acoustic wave filter. In one or more embodiments, the surface acoustic wave filter is configured to filter the frequency from the radio frequency mixer 306. In one or more embodiments, the radio frequency mixer converts the frequency of signals received from detection path 304 into an intermediate frequency. In one or more embodiments, the intermediate frequency is 10.7 MHz. In one or more embodiments, the intermediate frequency may be greater than or less than 10.7 MHz.

In one or more embodiments, local oscillator generator 308 is configured to generate radio signals. In one or more embodiments, local oscillator generator 308 is configured to transmit signals to radio frequency mixer 306. In one or more embodiments, local oscillation generator 308 comprises a synthesizer. In one or more embodiments, the synthesizer is configured to generate a radio signal based on the frequency of a signal received at antenna 108. In one or more embodiments, the synthesizer is configured to generate a signal with a frequency such that mixing the generated signal with the signal received at antenna 108 creates an intermediate frequency of 10.7 MHz. In one or more embodiments, the synthesizer is configured to generate a signal with a frequency such that mixing the generated signal with the signal received at antenna 108 creates an intermediate frequency of more or less than 10.7 MHz.

In one or more embodiments, a radio frequency generated by radio frequency mixer 306 is fed to a radio frequency detector 310. In one or more embodiments, radio frequency detector 310 is configured to detect the frequency of the radio signal output by radio frequency mixer 306. In one or more embodiments, radio frequency detector 310 is configured to determine the signal amplitude of the radio signal output by radio frequency mixer 306. In one or more embodiments, radio frequency detector 310 generates an output indicating the frequency generated by the radio frequency mixer 306. In one or more embodiments, the output is an electrical signal with a voltage proportional to the output of the radio frequency mixer.

In one or more embodiments, the output of radio frequency detector 310 is received by a filter and gain block 312. In one or more embodiments, filter and gain block 312 is used to filter the output of the radio frequency detector 310. In one or more embodiments, filter and gain block 312 removes signals with unwanted frequencies. In one or more embodiments, filter and gain block 312 is used to scale the output of radio frequency detector 310. In one or more embodiments, filter and gain block 310 multiplies the output of radio frequency detector 310 by a constant gain value.

In one or more embodiments, the output of filter and gain block 312 is received by analog-to-digital converter 314. In one or more embodiments, the analog-to-digital converter 314 is configured to convert the output from filter and gain block 312 into a digital output. In one or more embodiments, analog-to-digital converter 314 is configured to convert the output from radio frequency detector 310 into a digital output. In one or more embodiments, the digital output of analog-to-digital converter 314 describes a radio signal type and/or a transmission direction of the signal received by antenna 108. In one or more embodiments, the digital output of analog-to-digital converter 314 describes Iridium. In one or more embodiments, the digital output describes INMARSAT. In one or more embodiments, the digital output describes a signal pulse width. In one or more embodiments, the digital output describes a signal amplitude. In one or more embodiments, the analog-to-digital converter output describes a frequency.

In one or more embodiments, the output of analog-to-digital converter 314 is received by processor 320. In one or more embodiments, processor 320 comprises a digital signal processor. In one or more embodiments, processor 320 hosts an algorithm for identifying an input frequency. In one or more embodiments, the input frequency corresponds to a frequency received at antenna 108. In one or more embodiments, the algorithm determines the input frequency based on a synthesizer tuned frequency. In one or more embodiments, the synthesizer tuned frequency corresponds to a frequency produced by local oscillator generator 308. In one or more embodiments, the algorithm determines an input frequency based on a detected signal amplitude. In one or more embodiments, the algorithm determines the input frequency based on the synthesizer tuned frequency and the detected signal amplitude. In one or more embodiments, the algorithm determines a radio signal type based on the input frequency. In one or more embodiments, the radio signal type comprises INMARSAT. In one or more embodiments, the radio signal type comprises Iridium. In one or more embodiments where the radio signal type comprises Iridium, the processor 320 further comprises an algorithm for differentiating between uplink and downlink signals. In one or more embodiments, the algorithm differentiates between Iridium uplink and downlink signals based on a signal pulse width. In one or more embodiments, an Iridium uplink transmit slot has a 8.28 ms pulse. In one or more embodiments, an Iridium downlink transmit slot has a 20.32 ms pulse. In one or more embodiments, processor 320 determines a strength of an INMARSAT or Iridium signal. In one or more embodiments, processor 320 hosts an algorithm that determines to toggle single pole double throw switch 326 based on the radio signal type, the radio signal strength, the transmission direction, or any combination of the radio signal type, the radio signal strength, and the transmission direction.

In one or more embodiments, the main path 305 leads to a single pole double throw switch 326. In one or more embodiments where processor 320 determines that a received signal has a radio signal type of INMARSAT, single pole double throw switch 326 is toggled to bring the signal to the INMARSAT path 325. In one or more embodiments, INMARSAT path 325 leads to diplexer 324. In one or more embodiments, single pole double throw switch 326 may be embodied by any switch type configured to transfer radio signals down INMARSAT path 325 or Iridium path 327.

In one or more embodiments, diplexer 324 is configured to isolate reception and transmission paths of INMARSAT signals. In one or more embodiments, an INMARSAT signal received at antenna 108 will be isolated to a receive path of a diplexer 324. In one or more embodiments, an INMARSAT signal to be transmitted by the antenna 108 will be isolated to a transmit path of diplexer 324.

In one or more embodiments, an INMARSAT signal isolated to a receive path of diplexer 324 is received by low noise amplifier and band pass filter 322. In one or more embodiments, the low noise amplifier and band pass filter 322 is configured to reject unwanted frequencies from received signals using a band pass filter component. In one or more embodiments, the low noise amplifier and band pass filter 322 is configured to amplify low power INMARSAT signals received at antenna 108 prior to the signals being processed by the INMARSAT modem using a low noise amplifier. In one or more embodiments, the low noise amplifier and band pass filter 322 compensates for loss at the single pole double throw switch 326.

In one or more embodiments, after being filtered or amplified by the low noise amplifier and band pass filter 322, a received INMARSAT signal is processed by the INMARSAT modem 318. In one or more embodiments, the INMARSAT modem transforms a received INMARSAT radio signal into a bitstream to be received by the processor 320. In one or more embodiments, the INMARSAT modem 318 transforms a bitstream received from the processor 320 into an INMARSAT radio signal to be transmitted by the antenna 108. In one or more embodiments, the INMARSAT modem comprises a low power modem.

In one or more embodiments, power amplifier 316 receives an INMARSAT radio signal from INMARSAT modem 318. In one or more embodiments, the INMARSAT signal is amplified by power amplifier 316. In one or more embodiments, power amplifier 316 delivers the signal to the diplexer 324. In one or more embodiments, the signal is transmitted by antenna 108.

In one or more embodiments where processor 320 determines that a received signal has a radio signal type of Iridium, single pole double throw switch 326 is toggled to bring the signal to the Iridium path 327. In one or more embodiments, Iridium path 327 leads to band pass filter 328. In one or more embodiments, band pass filter 328 is configured to reject unwanted frequencies from received signals. In one or more embodiments, band pass filter 328 comprises a surface acoustic wave filter. In one or more embodiments, the surface acoustic wave filter is configured to filter unwanted frequencies prior to a signal being delivered to Iridium Modem 330. In one or more embodiments, band pass filter 328 is configured to filter Iridium signals received from Iridium modem 330. In one or more embodiments, the surface acoustic wave filter is configured to filter Iridium signals received from Iridium modem 330.

In one or more embodiments, after being filtered at band pass filter 328, a received Iridium signal is processed by the Iridium modem 330. In one or more embodiments, the Iridium modem transforms a received Iridium radio signal into a bitstream to be received by the processor 320. In one or more embodiments, the Iridium modem 330 transforms a bitstream received from the processor 320 into an Iridium radio signal to be transmitted by the antenna 108. In one or more embodiments, the Iridium signal to be transmitted passes through band pass filter 328 and is transmitted by the antenna 108.

Figure 4:
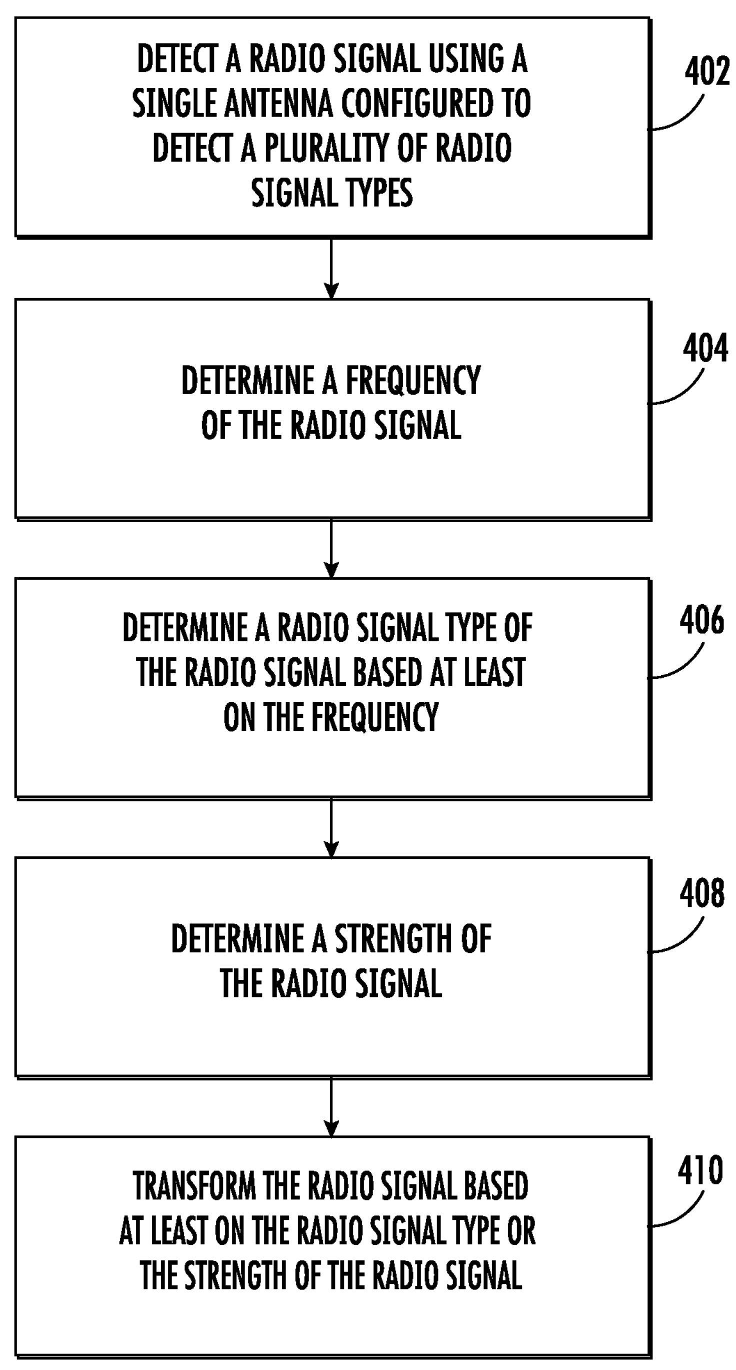
FIG. 4 illustrates an example flow diagram in accordance with various embodiments of the present disclosure.

Turning now to FIG. 4, a flowchart is provided depicting operations of an example process for transforming a radio signal in accordance with some example embodiments of the present disclosure. Specifically, FIG. 4 depicts operations of an example process 400. In some embodiments, the process 400 is embodied by a computer program code stored on a non-transitory computer-readable storage medium of a computer program product configured for execution to perform the process as depicted and described. Alternatively or additionally, in some embodiments, the process 400 is performed by one or more specially configured computing devices, such as the apparatus 200 alone or in communication with one or more other component(s), device(s), system (s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, process 400 is described as performed by and from the perspective of the apparatus 200.

The process 400 begins at operation 402. At operation 402, the apparatus 400 includes means such as the input/output circuitry 206, the communications circuitry 208, the signal transformation circuitry 210, or the like, or a combination thereof, that detects a radio signal using a single antenna configured to detect a plurality of radio signal types. In one or more embodiments, the single antenna is further configured to cause transmission of a plurality of radio signal types. In one or more embodiments, the single antenna is configured to detect a plurality of radio signal types onboard a vehicle. In one or more embodiments, the single antenna is configured to detect a plurality of radio signal types onboard an air vehicle. For example, the air vehicle may comprise a fixed wing air vehicle, rotary wing air vehicle, or the like. In one or more alternative embodiments, the single antenna is configured to detect a plurality of radio signal types onboard a ground vehicle, a water vehicle, or the like.

At operation 404, the apparatus 400 includes means such as the input/output circuitry 206, the communications circuitry 208, the signal transformation circuitry 210, or the like, or a combination thereof, that determines a frequency of the radio signal. In one or more embodiments, the frequency of the radio signal is between 1616 MHz and 1626 MHz. In one or more embodiments, the frequency is between 1525 MHz and 1559 MHz. In one or more embodiments, the frequency is between 1626.5 and 1660.5 MHz At operation 406, the apparatus 400 includes means such as the input/output circuitry 206, the communications circuitry 208, the signal transformation circuitry 210, or the like, or a combination thereof, that determines a radio signal type of the radio signal based at least on the frequency. In one or more embodiments, the radio signal type comprises INMARSAT. In one or more embodiments, the radio signal type comprises Iridium.

At operation 408, the apparatus 400 includes means such as the input/output circuitry 206, the communications circuitry 208, the signal transformation circuitry 210, or the like, or a combination thereof, that determines a strength of the radio signal. In one or more embodiments, the apparatus 400 further includes means such as the input/output circuitry 206, the communications circuitry 208, the signal transformation circuitry 210, or the like, or a combination thereof, that, in a circumstance where the radio signal type describes a common frequency range for uplink and downlink transmission, determines a signal pulse width of the radio signal. In one or more embodiments, the radio signal type comprises Iridium In one or more embodiments, the frequency is between 1616 MHz and 1626 MHz. In one or more embodiments, the apparatus 400 further includes means such as the input/output circuitry 206, the communications circuitry 208, the signal transformation circuitry 210, or the like, or a combination thereof, that determine a transmission direction indicative of a downlink command or an uplink command based at least on the signal pulse width. In one or more embodiments, a signal pulse width of 8.28 ms indicates an uplink command. In one or more embodiments, a signal pulse width of 20.32 ms indicates a downlink command.

At operation 410, the apparatus 400 includes means such as the input/output circuitry 206, the communications circuitry 208, the signal transformation circuitry 210, or the like, or a combination thereof, that transforms the radio signal based at least on the radio signal type or the strength of the radio signal. In one or more embodiments, the radio signal type is transformed based further on the transmission direction. In one or more embodiments, transforming the radio signal comprises toggling a switch position based at least in part on at least one of the radio signal type and the strength of the radio signal. In one or more embodiments, the switch position controls a radio signal transformation.

Figure 5:
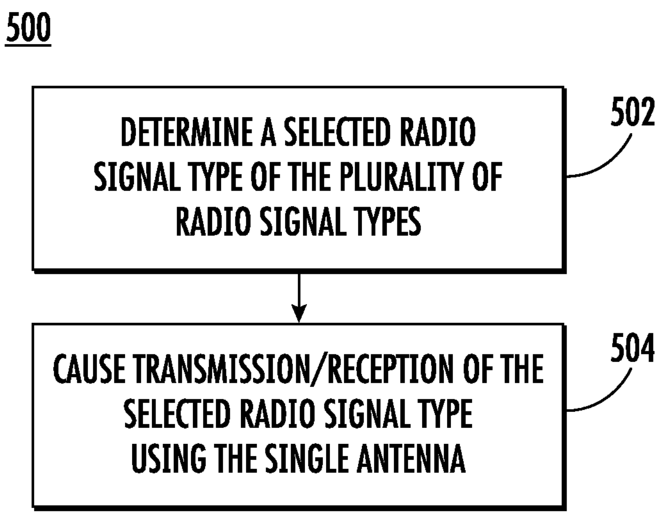
FIG. 5 illustrates an example flow diagram in accordance with various embodiments of the present disclosure.

Turning now to FIG. 5, a flowchart is provided depicting operations of an example process for causing transmission of a radio signal in accordance with some example embodiments of the present disclosure. Specifically, FIG. 5 depicts operations of an example process 500. In some embodiments, the process 500 is embodied by a computer program code stored on a non-transitory computer-readable storage medium of a computer program product configured for execution to perform the process as depicted and described. Alternatively or additionally, in some embodiments, the process 500 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, process 500 is described as performed by and from the perspective of the apparatus 200.

The process 500 begins at operation 502. At operation 502, the apparatus 500 includes means such as the input/output circuitry 206, the communications circuitry 208, the signal transformation circuitry 210, or the like, or a combination thereof, that determines a selected radio signal type of the plurality of radio signal types. In one or more embodiments, the selected radio signal type comprises Iridium. In one or more embodiments, the selected radio signal type comprises INMARSAT. In one or more embodiments, the radio signal type is selected based on a switch position. In one or more embodiments, the switch position is toggled based at least in part on at least one of the radio signal type and the strength of the radio signal.

At operation 504, the apparatus 500 includes means such as the input/output circuitry 206, the communications circuitry 208, the signal transformation circuitry 210, or the like, or a combination thereof, that causes transmission of the selected radio signal type using the single antenna. In one or more embodiments, the apparatus 500 includes means such as the input/output circuitry 206, the communications circuitry 208, the signal transformation circuitry 210, or the like, or a combination thereof, that causes reception of the selected radio signal type using the single antenna. In one or more embodiments, the single antenna is configured to cause transmission and/or reception of a plurality of radio signal types from a vehicle. In one or more embodiments, the single antenna is configured to cause transmission and/or reception of a plurality of radio signal types from an air vehicle. For example, the air vehicle may comprise a fixed wing air vehicle, rotary wing air vehicle, or the like. In one or more alternative embodiments, the single antenna is configured to cause transmission and/or reception of the plurality of radio signal types from a ground vehicle, a water vehicle, or the like.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid infrastructures.

A computer-program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

That which is claimed:

1. A computer-implemented method, comprising:

detecting a radio signal using a single antenna configured to detect a plurality of radio signal types;

determining a frequency of the radio signal;

determining a radio signal type of the radio signal based at least on the frequency;

in response to determining that the radio signal type describes a common frequency range for uplink and downlink transmission;

determining a signal pulse width of the radio signal;

determining a strength of the radio signal; and transforming the radio signal based at least on the radio signal type or the strength of the radio signal.

2. The computer-implemented method of claim 1, wherein the single antenna is further configured to cause transmission of a plurality of radio signal types.

3. The computer-implemented method of claim 2, further comprising:

determining a selected radio signal type of the plurality of radio signal types; and causing transmission of the selected radio signal type using the single antenna.

4. The computer-implemented method of claim 1, wherein the radio signal type comprises one of Iridium or INMARSAT.

5. The computer-implemented method of claim 1, further comprising: determining a transmission direction indicative of a downlink command or an uplink command of the radio signal based at least on the signal pulse width.

6. The computer-implemented method of claim 5, wherein the radio signal is transformed based further on the transmission direction.

7. The computer-implemented method of claim 6, wherein transforming the radio signal comprises toggling a switch position based at least in part on at least one of the radio signal type and the strength of the radio signal.

8. The computer-implemented method of claim 7, wherein the switch position controls a radio signal transformation.

9. An apparatus comprising at least one processor and at least one non-transitory memory comprising program code, wherein the at least one non-transitory memory and the program code are configured to, with the at least one processor, cause the apparatus to at least:

detect a radio signal using a single antenna configured to detect a plurality of radio signal types;

determine a frequency of the radio signal;

determine a radio signal type of the radio signal based at least on the frequency;

in response to determining that the radio signal type describes a common frequency range for uplink and downlink transmission;

determining a signal pulse width of the radio signal;

determine a strength of the radio signal; and transform the radio signal based at least on the radio signal type or the strength of the radio signal.

10. The apparatus of claim 9, wherein the single antenna is further configured to cause transmission of a plurality of radio signal types.

11. The apparatus of claim 10, wherein the at least one non-transitory memory and the program code are configured to, with the at least one processor, cause the apparatus to further:

determine a selected radio signal type of the plurality of radio signal types; and cause transmission of the selected radio signal type using the single antenna.

12. The apparatus of claim 11, wherein the radio signal type comprises one of Iridium or INMARSAT.

13. The apparatus of claim 9, wherein the at least one non-transitory memory and the program code are configured to, with the at least one processor, cause the apparatus to further: determine a transmission direction indicative of a downlink command or an uplink command of the radio signal based at least on the signal pulse width.

14. The apparatus of claim 13, wherein the radio signal is transformed based further on the transmission direction.

15. The apparatus of claim 14, wherein transforming the radio signal comprises toggling a switch position based at least in part on at least one of the radio signal type, and the strength of the radio signal.

16. The apparatus of claim 15, wherein the switch position controls a radio signal transformation.

17. A computer program product comprising at least one non-transitory computer-readable storage medium having computer-readable program code portions stored therein, the computer-readable program code portions comprising an executable portion configured to:

detect a radio signal using a single antenna configured to detect a plurality of radio signal types;

determine a frequency of the radio signal;

determine a radio signal type of the radio signal based at least on the frequency;

in response to determining that the radio signal type describes a common frequency range for uplink and downlink transmission;

determining a signal pulse width of the radio signal;

determine a strength of the radio signal; and transform the radio signal based at least on the radio signal type or the strength of the radio signal.

18. The computer program product of claim 17, wherein the single antenna is further configured to cause transmission of a plurality of radio signal types.

* * * * *